No. 844,592. PATENTED FEB. 19, 1907.
W. A. HARMAN.
CUTTING BOARD.
APPLICATION FILED SEPT. 17, 1906.
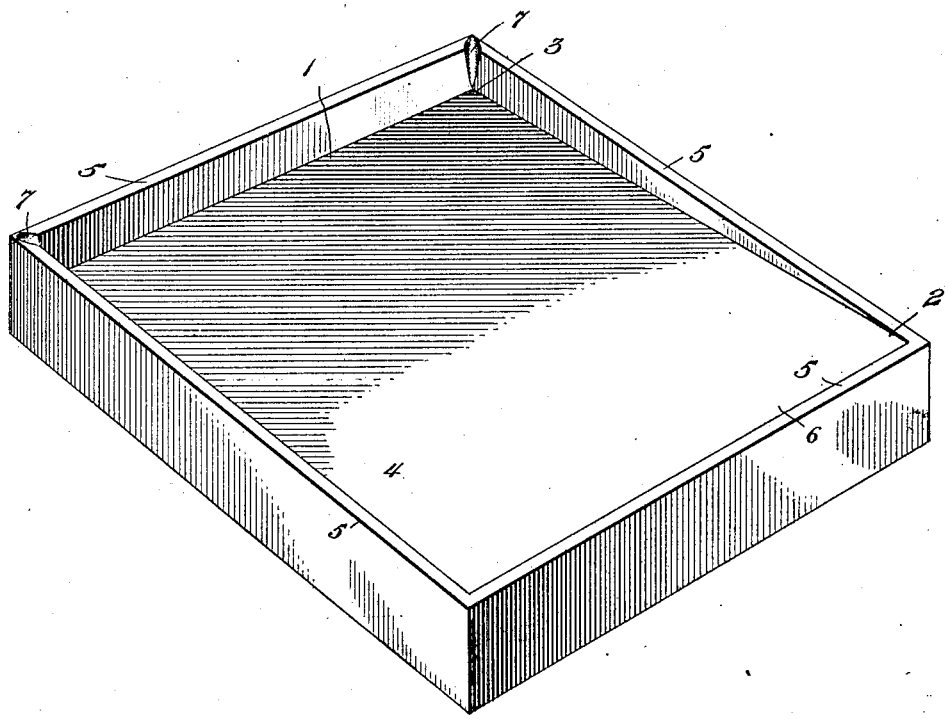
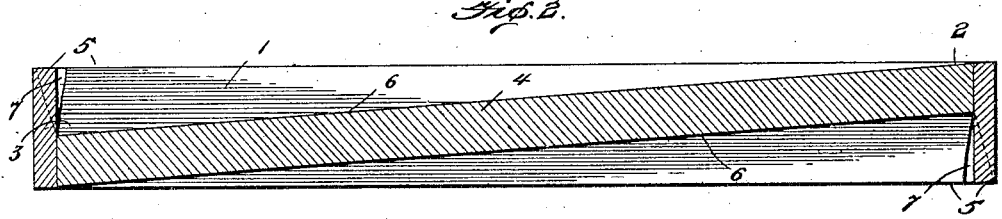
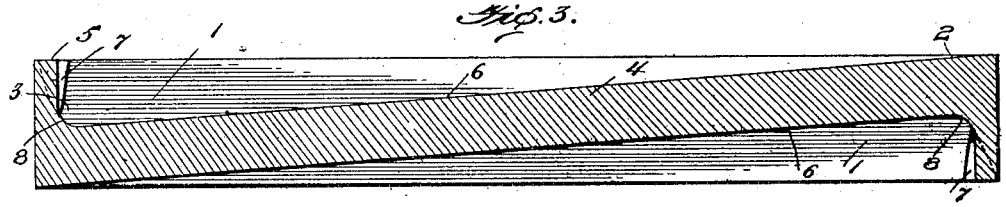
William Adalbert Harman
INVENTOR
WITNESSES:
By
ATTORNEYS

UNITED STATES PATENT OFFICE.

WILLIAM ADALBERT HARMAN, OF WHITE HORSE, DISTRICT OF ALASKA.

CUTTING-BOARD.

No. 844,592. Specification of Letters Patent. Patented Feb. 19, 1907.

Application filed September 17, 1906. Serial No. 334,920.

*To all whom it may concern:*

Be it known that I, WILLIAM ADALBERT HARMAN, a citizen of the United States, residing at White Horse, Yukon Territory, Alaska, have invented a new and useful Cutting-Board, of which the following is a specification.

This invention relates to an improved cutting-board.

It is well known that in the kitchens of restaurants, hotels, and the like difficulty is frequently experienced in cutting meat—such, for example, as roast beef, roast lamb, and the like—as the juice is very liable to run as soon as the first incision has been made with the knife. It is of course highly desirable to collect the juice, and for this reason in a large number of kitchens the meat is cut in a metallic pan. The disadvantage of using a metallic pan, however, resides in the fact that each time the carving-knife comes into contact with the metallic pan its edge is materially dulled. In most kitchens if a metallic pan be not employed difficulty is experienced in collecting the gravy, as above explained.

With the foregoing disadvantages in view the object of the present invention is to provide as a new article of manufacture a simple, durable, and inexpensive meat-cutter which is in the form of a board having suitable depressions in its opposite sides adapted to collect the gravy, the depressions being formed with suitable pouring-grooves, and the wood or other soft material from which the board may be constructed being adapted to receive the contact of a carving-knife without dulling the same.

With the foregoing and other objects in view, which will appear as the description proceeds, the invention resides in the novel form of meat-cutter hereinafter described and claimed.

In the accompanying drawings, forming part of this specification, Figure 1 is a perspective view of a cutting-board constructed in accordance with my invention. Fig. 2 is a longitudinal sectional view of the same. Fig. 3 is a similar view illustrating a modified form of the invention.

Like reference-numerals indicate corresponding parts in the different figures of the drawings.

As shown in the accompanying drawings, the improved meat-cutter or cutting-board of this invention is formed in each of its upper and lower surfaces with a trough 1. Each of the troughs 1 is formed with a shallow end 2 and a deep end 3, the deep end of one trough being disposed at the end of the board opposite the deep end of the other trough. The troughs 1 preferably are produced by means of a diagonally-extending partition 4, which is suitably held within the rim or border 5 by means of nails or other suitable devices. As shown clearly in the drawings, the bottom 6 of each trough 1, which is formed by the partition 4, at one end is flush with the upper edge of the rim 5 and inclines gradually downward until it reaches the rim at the other end of the cutting-board. At its deep end each of the troughs 1 preferably is provided with a pair of pouring-grooves 7, which are located at the corners of the cutting-board and are formed in the rim 5.

In the modified construction illustrated in Fig. 3 the entire cutting-board is formed in one piece of wood or other suitable soft material, so that the rim 5 and the diagonally-extending partition 4 are integral with each other. In this form of the invention the sides and deep ends of the troughs 1 1 are formed with rounded corners, as shown at 8, so as to prevent the collection of grease or gravy at these points and to permit the board to be readily scraped with a sharp instrument whenever desired. Aside from the fact that the modified construction is formed of one piece of material it is the same in all other respects, such as general shape and arrangement, as the preferred construction.

In using the improved device it is only necessary to place the piece of meat or other material which is to be carved in one or the other of the troughs 1. During the cutting operation the cutting edge of the knife can come in contact with the cutting-board without becoming dulled. The gravy or juice which escapes from the meat during the cutting operation is collected in the deep end of the upper trough 1 and at the completion of the cutting operation can be poured off into any suitable receptacle. After the meat has been cut and removed from the board if it is desired to cut any other substance—such, for example, as vegetables or the like—the board is reversed or turned upside down, so as to perform the second cutting operation in the other trough 1, which is clean.

By forming the improved cutting-board with two troughs each having a shallow end and a deep end arranged oppositely with respect to each other by means of the diagonally-extending partition 4 the improved device is rendered very simple, durable, and compact in construction, so that it takes up very little space and can be easily packed away when not in use.

While it is preferable to construct the improved cutting-board of wood by reason of the fact that such material is not only inexpensive, but is also soft, so as not to dull the edge of a knife which comes in contact therewith, it will be understood that the invention is not to be limited to the use of wood, as any other soft or comparatively soft material which is suitable for the purpose can be employed.

What is claimed is—

1. As a new article of manufacture, a reversible cutting-board having a rim and a diagonally-extending partition forming oppositely-arranged troughs in the two sides of the board.

2. As a new article of manufacture, a reversible cutting-board comprising a rim and a diagonally-extending partition in said rim forming two troughs, the bottom of each trough at one end being flush with the top of the rim and inclined downwardly until it reaches the rim at the other end of the board.

In testimony that I claim the foregoing as my own I have hereto affixed my signature in the presence of two witnesses.

WILLIAM ADALBERT HARMAN.

Witnesses:
WILLIAM H. CLEVELAND,
FRANK E. McINTYRE.